Oct. 22, 1940.      L. H. DE WYK ET AL      2,218,527
FEEDING PREDETERMINED CHARGES TO TRAVELING MOLDS
Filed Aug. 11, 1937      4 Sheets-Sheet 1
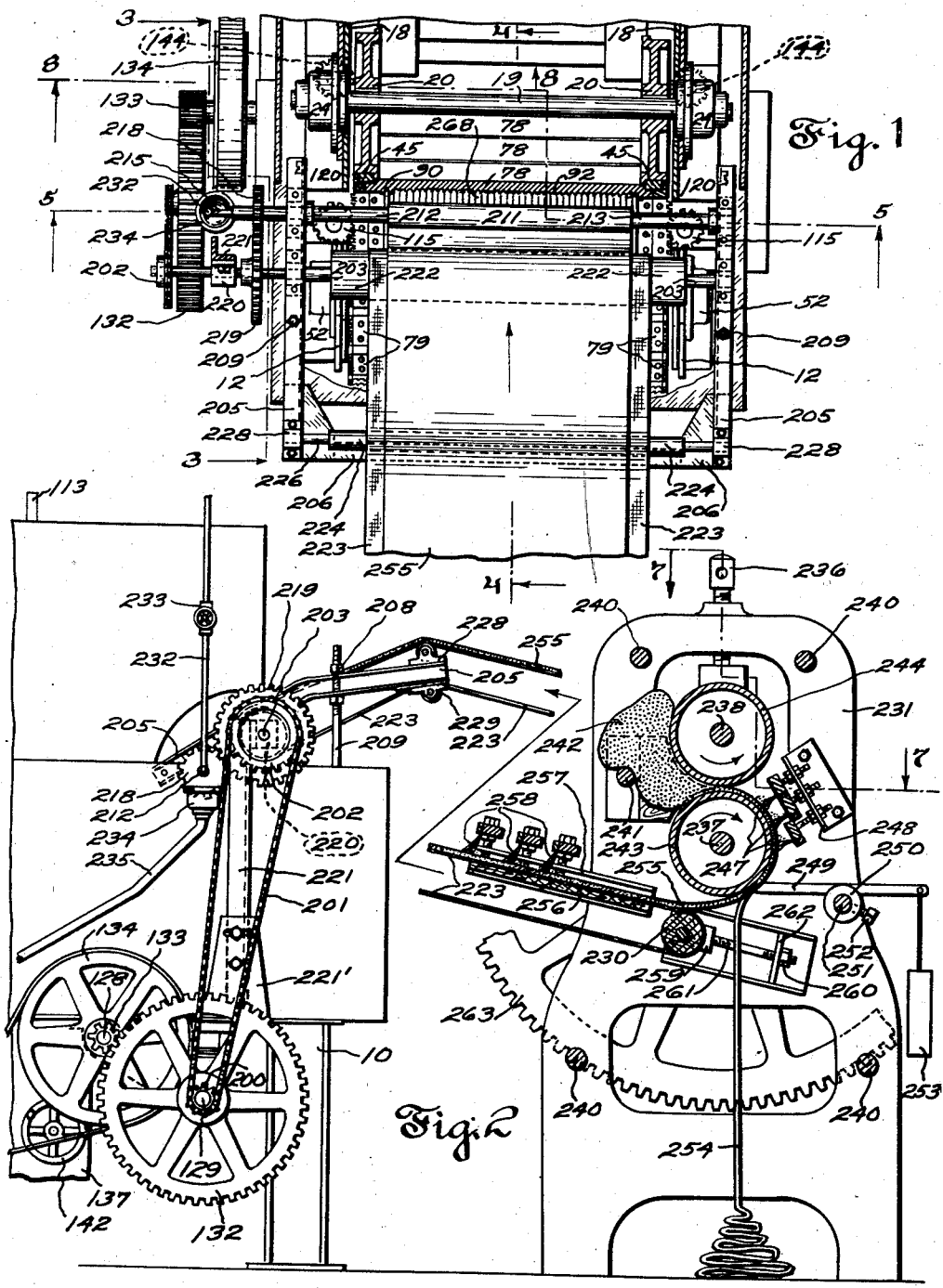
INVENTORS
Rudolf H. De Wyk,
BY Rudolf H. De Wyk, Jr.
ATTORNEY Oct. 22, 1940. L. H. DE WYK ET AL 2,218,527
FEEDING PREDETERMINED CHARGES TO TRAVELING MOLDS
Filed Aug. 11, 1937 4 Sheets-Sheet 2
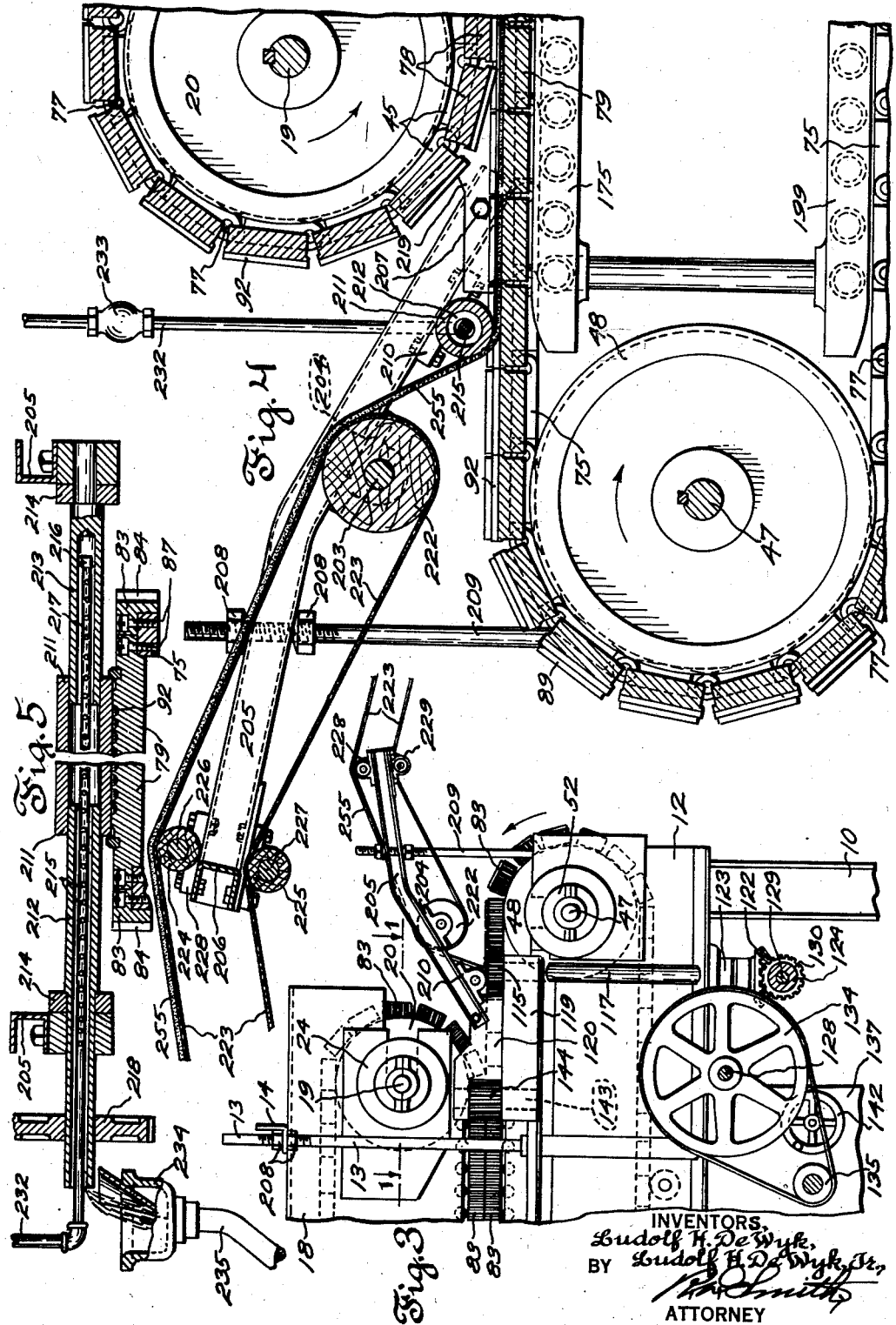
INVENTORS.
Ludolf H. DeWyk,
BY Ludolf H. DeWyk, Jr.
ATTORNEY Oct. 22, 1940.　　L. H. DE WYK ET AL　　2,218,527
FEEDING PREDETERMINED CHARGES TO TRAVELING MOLDS
Filed Aug. 11, 1937　　4 Sheets-Sheet 3
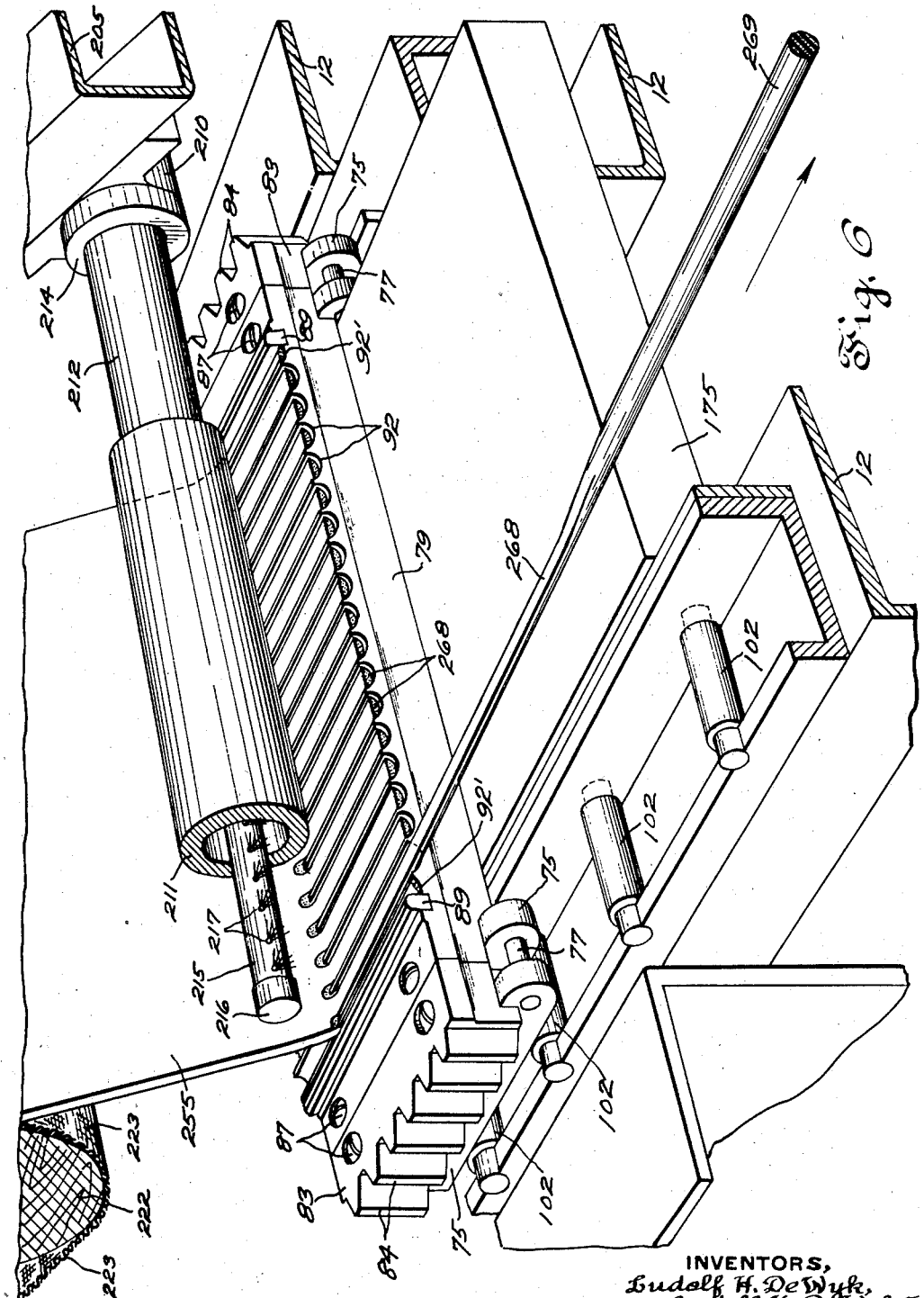
INVENTORS,
Ludolf H. De Wyk,
Ludolf H. De Wyk, Jr.
BY
ATTORNEY Oct. 22, 1940.   L. H. DE WYK ET AL   2,218,527
FEEDING PREDETERMINED CHARGES TO TRAVELING MOLDS
Filed Aug. 11, 1937   4 Sheets-Sheet 4

INVENTORS
Ludolf H. De Wyk,
Ludolf H. De Wyk Jr,
BY
ATTORNEY

Patented Oct. 22, 1940

2,218,527

UNITED STATES PATENT OFFICE 2,218,527

FEEDING PREDETERMINED CHARGES TO TRAVELING MOLDS

Ludolf H. De Wyk, Ansonia, and Ludolf H. De Wyk, Jr., Shelton, Conn., assignors to The Sponge Rubber Products Company, Shelton, Conn., a corporation of Connecticut Application August 11, 1937, Serial No. 158,468

18 Claims. (Cl. 18—10)

This invention relates to the art of and to apparatus for converting a bulk supply or replenishable batch of plastic material into a continually traveling sheet of said material having predetermined cross sectional dimensions and unlimited length, and to the contemporaneous and continuous feeding of such converted form of material into a cavity or cavities of traveling molds, and particularly concerns the automatic segregating of separate charges of material from such sheet and the simultaneous depositing of such charges in respectively different cavities of the molds or carriers as an operation continuous with the passing travel thereof.

One object of the invention is automatically to prepare and deliver material, of the nature of sponge rubber compound, to cavities of traveling molds in a heat treating machine of the molding and vulcanizing type, one example of which is partially disclosed herein, and more fully illustrated and described in the co-pending application of Ludolf H. De Wyk, Serial No. 111,769, as well as in U. S. Patent No. 2,200,-262, granted May 14, 1940, to F. M. Daley et al.

Another object is to provide means automatically to control and predetermine the volumetric size of the charges of sponge rubber compound or other plastic material so delivered to the mold cavity or cavities in order to insure that a uniform amount of space is provided within the traveling mold cavity for progressive expansion of the material during its heat treatment so that a uniform and controllable degree of porosity will be produced throughout the body of the material in the fully vulcanized condition in which it leaves the machine.

A further object is to convey a sheet of stretchable plastic material having a naturally soft and sticky surface, without stretching or distorting the same during its travel from the supply batch to the point of delivery of segregated charges of the calendered material to the cavities in the traveling carriers.

A general object of these improvements is to provide an apparatus capable of carrying out the foregoing objectives with minimum requirement for attention by the operator of the machine so that labor cost involved in the continuous molding and vulcanizing of an unlimited length of sponge rubber product is materially reduced.

A companion object is to so construct the feeding and severing apparatus that it may be quickly removed from and restored to its position on the molding and vulcanizing machine for cooperating therewith, thus to permit change of molds in the machine or independent servicing of either the machine or the apparatus, or use of the same feeding and severing apparatus with different machines as well as replacement of a given apparatus on a given machine by a different feeding and severing apparatus.

The foregoing and other important objects later to be mentioned are accomplished by methods and apparatus described in detail in the following specification in which reference is had to the accompanying drawings, wherein:

Fig. 1 is a plan view of that portion of the improved feeding and severing apparatus which is immediately attached to and supported by the material receiving end of the molding and vulcanizing machine of the co-pending application or issued patent hereinbefore referred to and shows certain parts of the said vulcanizing machine, partially in section on plane 1—1 in Fig. 3.

Fig. 2 is a side elevation looking from the left at Fig. 1 and further shows a calender in side elevation, by means of which bulk supplies of the material are continually converted into the traveling sheet of material, parts of the calendering machine appearing in section on the plane 2—2 in Fig. 7.

Fig. 3 is a view in similar elevation taken on the section planes 3—3 in Fig. 1 looking in the direction of the arrows, the heat retaining jacket which encases the molding and vulcanizing machine being removed to expose details of the power drive for the machine and for the feeding and severing apparatus.

Fig. 4 is a fragmentary enlarged sectional view taken on the plane 4—4 in Fig. 1 looking in the direction of the arrows.

Fig. 5 is a fragmentary view drawn on the same scale as Fig. 4 and is taken in section on the plane 5—5 in Fig. 1 looking in the direction of the arrows showing details of the water-cooled feeding and severing roller and parts cooperative therewith including one of the cavity containing mold sections which cooperate with said roller in their travel.

Fig. 6 is a fragmentary perspective view on a still further enlarged scale looking at the water-cooled roller and some of its cooperative parts in a direction toward the approaching sheet of plastic material from a point of view above the mold cavities and at the right side of Fig. 1.

Figure 8:
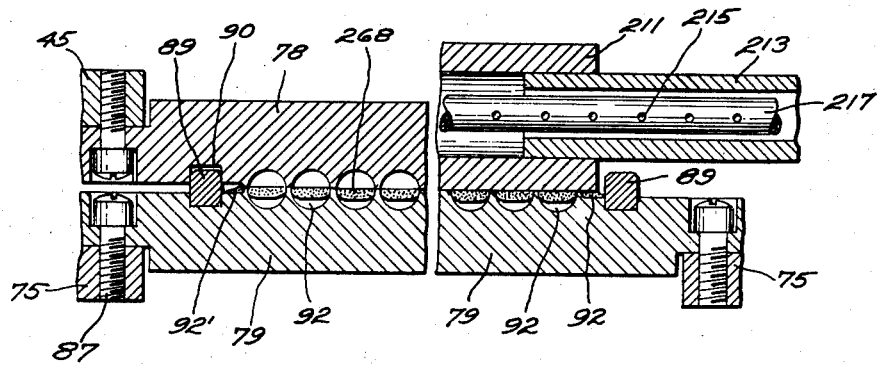

Fig. 8 is a laterally contracted fragmentary sectional view on a much enlarged scale showing at the left side, the cooperating relationship of a mold section of the lower train with a corresponding mold section of the upper train on the section plane 8—8 in Fig. 1 and showing at the right side, the cooperating relationship of a mold section of the lower train with one end portion of the water cooled roller on the section plane 5—5 in Fig. 1.

For convenience of reference, the parts of a vulcanizing and molding machine with which the improved feeding and severing apparatus may be novelly combined are designated in the drawings by the same reference characters by which they are designated in the drawings of the co-pending application hereinbefore referred to. Additional details of the molding and vulcanizing machine are fully illustrated and described in the said co-pending application.

10 indicates one of the legs which may support the molding and vulcanizing machine whose frame includes two upper channel beams 18 extending lengthwise of the machine in spaced and parallel relation and suspended from transverse angle strips 14. Opposite ends of strips such as 14 are supported at spaced points lengthwise of the machine in vertically adjustable position by upwardly extending threaded posts 13 rigidly anchored at their bottom ends in two lower channel beams 12 respectively aligned with and positioned below the beams 18 and resting on a series of legs such as 10.

Supported in bearings 52 at the material receiving end of the lower portion of the molding and vulcanizing machine is the transversely extending shaft 47 which, at respectively opposite sides of the machine, carries fixed thereto two flanged wheels 48 freely rotatable so that their peripheries may move in unison with links 75 of two laterally spaced lower chains which are respectively looped about said peripheries.

Supported in bearings 24, also at the material receiving end of the upper portion of the molding and vulcanizing machine, is the shaft 19 which is spaced a substantial distance beyond the shaft 47 lengthwise of the machine in the direction of travel of the chain links 45 thereby to make room for the feeding and severing apparatus of these improvements. Shaft 19 carries fixed thereto two flanged wheels 20 adapted for rotation so that their peripheries may move in unison with links 45 of the laterally spaced upper chains which are respectively looped about said peripheries.

To each of the links 75 of the lower chains is fixedly secured by screws 87 one end of a mold section 79 extending crosswise the machine to bridge and be carried by the two lower chains of links, each section 79 containing adjacent mold cavities extending lengthwise of the machine. To each of the said links 45 of the upper chains is fixedly secured by similar screws 87 one end of a mold section 78 correspondingly disposed, which may have correspondingly disposed mold cavities 92.

The mold cavities 92 both of mold sections 78 and 79 may accord or be different in size and shape, but preferably register with each other when the mold sections of the upper and lower chains come together as at the right side of Fig. 4. The chain links are interconnected by pivotal pins 77 having centers spaced in relation to the width of the mold sections in the way and for the purpose set forth in the aforesaid co-pending application. Each link 75 further has secured to it by similar screws 87 a block 83 carrying gear teeth 84, and each link 45 has secured to it by similar screws 87 a similar block 83 carrying gear teeth 84. These blocks are so arranged that the teeth 84 comprise in effect a continuous traveling rack along the straightaway stretches of the chain.

In Fig. 3 means are shown for driving all chains of links at uniform speed as in the machine of the aforesaid co-pending application, such means comprising two spur gears 115, one at each side of the machine, constantly in mesh with the rack teeth 84 on the blocks of only the lower chain links 75, and fast to the upper end of vertical shafts 117 respectively, which have bearings 119 at the top and 123 at the bottom thereof carried by the machine frame. Drive gears 115 are powered through shafts 117 by the bevel gears 122 fixed to the bottom ends of the shafts and which are in mesh respectively with bevel pinions 130 fixed on the horizontal shaft 129 at opposite sides of the machine. Shaft 129 has bearing at each side of the machine in frame bracket 124 which also affords bearing for a shaft 128 parallel to shaft 129. A large gear 132 fixed to shaft 129 is in mesh with the spur pinion 133 fixed to shaft 128. The latter shaft further carries fixed thereto, a large pulley 134 belted to a smaller pulley 135 which receives power from a variable speed transmission contained within the casing 137 to which transmission, power may be furnished by an electric motor or other prime mover not herein shown. The hand wheel 142 represents the usual manual means for adjusting the interior mechanism of the transmission to determine the speed at which pulley 135 is driven, thereby to control the speed of travel of the mold carrying chains of the machine in the directions of the arrows in Fig. 4. In Fig. 3 a spur gear 144 is rotatably mounted on a stationary vertical pivot shaft 143 held in the bearing blocks 119 and 120 in a manner to mesh with the rack teeth 84 on the gear blocks of both links 45 and 75 simultaneously so that the travel of the links 75 of the lower chain toward the left in Fig. 3 is transmitted by gear 144 to links 75 of the upper chain to cause the latter to travel in the same direction and in unison therewith.

The co-pending application before referred to discloses brake means at the work discharging end (not herein shown) of the vulcanizing machine which brake means acts through additional gears enmeshed with the toothed blocks 83 of both trains of mold sections to oppose the travel of such sections toward the left in Fig. 3 thereby insuring that the constant urging of mold sections 78 and 79 toward the left by gears 115 and 144 shall thrust each mold section tightly against its neighbor in the same train and thus prevent spaces from developing between abutting edges of adjacent mold sections. Such spaces if occurring would be admissive to the material in the manner of depositing the same within the mold cavities proposed by these improvements.

While Figs. 3 and 6 indicate the chain links 75 as riding upon and supported by a track of antifriction rollers 102 which may be pivoted in ball or roller bearings or in plain bearings as here shown in Fig. 6, stationary ways or other means of support may be used in their stead. Some one or more of such rollers or equivalent support means are preferably disposed firmly to support the weight of and to determine a positive line of travel for each mold section as it reaches and passes the position in which mold section 79 is shown in Fig. 6 or in which the mold section 79 directly beneath roller 211 is shown in Fig. 4.

In Fig. 4 an upper steam plate 175 and a lower steam plate 199 are stationed close to the path of travel of mold sections 79 thereby to radiate heat to same in both directions of travel in Fig. 4. These steam plates extend well toward the left end of the straight-away stretches of the chains of links 75 so that the mold sections do not have time to cool during their journey in a clockwise direction around the chain supporting wheels 48.

The traveling sheet of compound 255 is progressively directed downward toward the line of contact of the traveling mold sections 79 and the roller 211 by the mangle-like pull exerted by these parts whose contacting surfaces may travel at equal linear speed and at a linear speed equal to the speed of play-off of the sheet material from a conveyor belt 223. Roller 211 may be slightly shorter than the space between keys 89 which are embedded in opposite ends of mold sections 79 respectively and which upstand from the cavity containing surfaces thereof. These keys may serve to support the weight of the mold sections 92 as the latter travel idly from right to left with the lower stretch of the chain in Fig. 4 in the manner disclosed in the said co-pending application, thereby to protect and preserve the perfection of the mold surfaces which coact with roller 211. The keys also engage corresponding keyways in mold sections 78 and thereby cause the cavities in sections 97 and 78 to register with each other accurately and form closed mold chambers of predetermined cross sectional size.

Shallow recesses 92' are sunk in the mold face adjacent the inner upright faces of the keys to provide ample space to receive any small amount of the sheet material severed from the extreme edges of the sheet in excess of that lodged in the outermost molding cavities 92.

The feeding and severing apparatus of these improvements derives its driving power from shaft 129 of the molding and vulcanizing machine so that the speed of movement of the feeding and severing mechanism may be synchronized with the speed of travel of the traveling mold sections 75 and 78.

Fig. 2 shows the small sprocket wheel 200 fixed to the extreme outer end of shaft 129 to be rotated in unison with gear 132. By means of the drive chain 201, sprocket wheel 200 rotates a larger sprocket wheel 202 which is fast to the end of a horizontal shaft 203 which extends crosswise the machine above the horizontal train of mold sections 75. Shaft 203 has main bearings in blocks 204 bolted respectively to the under surfaces of the side arms 205 of a U-shaped apparatus support frame best shown in Figs. 1 and 4, which frame is comprised by the said side arms 205 and a transverse member 206 rigidly connecting them together at their extreme ends. Both the side arms 205 and the transverse member 206 are conveniently made of channel beams whose lower ends are bolted against the outwardly disposed sides of the bearing caps 120 which are bolted to bearing blocks 119 which are rigid with the frame of the molding and vulcanizing machine. Thus, when their concentrically aligned holding bolts 207 are loosened, the side arms 205 may be pivotally adjusted about these bolts and thus raised or lowered, their desired adjustment being maintained by nuts 208 having threaded engagement with an upright rod 209 of which there is one for each side arm 205. Rods 209 are rigidly supported by and upstand respectively from the lower channel beams 12 of the machine frame.

Additional bearing blocks 210 bolted to the under surface of frame arms 205 support a water-cooled roller structure 211 whose details are best shown in Fig. 5, and in such position that the outer periphery of this roller may be caused to bear downwardly against the upper surfaces of the mold sections 79 with any desired degree of pressure as the mold sections travel from left to right and pass the roller in Fig. 4.

With reference to Fig. 5, roller 211 which is here shown in contracted length, comprises a hollow tube from whose left end projects the hollow trunnion 212 and from whose right end projects the hollow trunnion 213, which trunnions may be welded or otherwise fixedly secured preferably in watertight relation to the inner bore of the roller. Each of these trunnions has a slightly reduced diameter at its end portion, these end portions being rotatably mounted in the bearing blocks 210 respectively. Bushings 214 carried against the shoulders of the trunnions take axial thrust in both directions.

The projecting trunnion 212 is open ended to give entrance to a water supply pipe 215 which is plugged by the cap 216 at its extremity and has spray orifices 217 spaced along its length to give outlet for the water from pipe 215 to the hollow interiors of roller 211 and its trunnions 212 and 213. The extremity of the latter trunnion is closed so that the water thus delivered to roller 211 finds outlet only from the extremity of trunnion 212. Trunnion 212 carries fixed thereto the spur gear 218 which is in mesh with a larger spur gear 219 fast to shaft 203. The latter shaft has an auxiliary bearing in the block 220 which is fast to an upright post 221 rigidly supported by the frame of the molding and vulcanizing machine. The upper end of post 221 may be swung slightly to the right or left relative to its fixed base bracket 221' and bearing block 220 may be shifted slightly up or down on post 221 to accord axially with the adjustable position of bearings 210. Elongated slots in the bracket provide for such shifting.

Between the side arms 205 of the feeding and severing apparatus, frame shaft 203 carries the wide pulley 222 which may be made of wood or suitably light material having a good friction surface and which supports and impels one end of the endless fabric belt 223. This belt derives auxiliary support from two smaller idler pulleys 224 and 225 carried respectively on shafts 226 and 227, these shafts having bearings at each of their ends in blocks 228 and 229 respectively bolted to the extremity of the side arms 205 of the feeding and severing apparatus frame.

Fig. 2 represents the opposite end of the endless fabric belt 223 as passing around and supported by the tightener pulley 230 rotatably mounted between frame uprights 231 of a calender which conditions and delivers the continuous supply 242 of plastic material to the top surface of the endless traveling belt 223 in the form of a traveling sheet 255 of unlimited length.

In Fig. 2 the water delivery pipe 215 within the roller 211 is shown to be connected with, and in part supported by, an upright water supply pipe 232 which may run to any source of water having a pressure head, and in which the regulating or shut-off valve 233 is placed to control the flow of water. Used water, discharged from the open end of the trunnion 212, may be received into a drain cup 234 having the drain pipe 235 to carry away the water.

Figure 7:
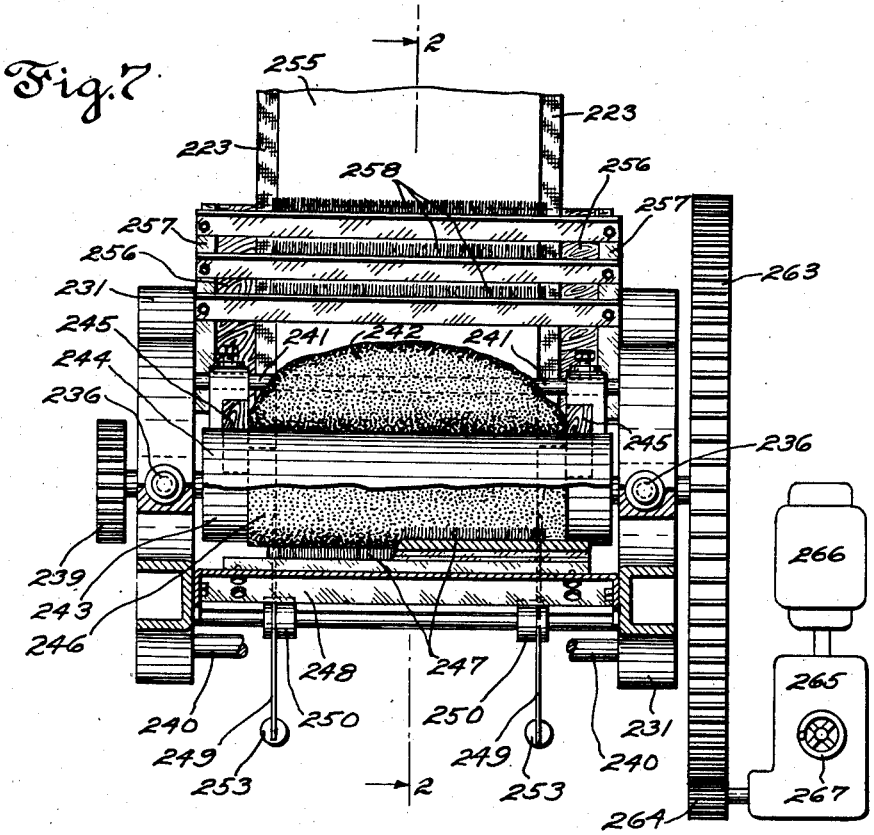
Fig. 7 is a plan view of the calender partially in section on the plane 7—7 in Fig. 2, certain parts being broken away.

The calender of Figs. 2 and 7, hereinbefore mentioned, comprises between the frame uprights 231 the lower hot roller 243 having fixed bearings in the frame and the cooperative upper hot roller 244 having adjustable bearings in the frame which may be raised or lowered by the screw posts 236. Rollers 243 and 244 may be heated by any of the well known methods and means (not herein shown) such as by the introduction of steam to the hollow interiors of these rollers. Preferably the roller shafts 237 and 238 each carry a gear such as 239 in Fig. 7, which gears are intermeshed to cause the rollers to rotate in opposite directions at the same speed as well understood in the art of calendering.

The frame uprights 231 are braced by tie rods 240, of which four are shown in Fig. 2, while a fifth rod 241 spans the space between the frames to provide a support rail for the replenishable bulk supply or batch 242 of sponge rubber compound or similar plastic material. Lateral constraint for the batch 242 is afforded by the spur-shaped side blocks 245 adjustably mounted on the rail 241 and serving to roughly determine the width of the calendered material 246 carried by roller 243 at the time the material passes between the two rollers.

At this point in the travel of the calendered compound while the latter is clinging to the surface of roller 243, a suitable application of powdered material such as soapstone, starch or the like is made with the assistance of a gang of brushes 247 adjustably mounted on the machine frames 231 by means of the laterally extending bracket 248 and coextensive in length with the width of the calendered material 246. The powdered material referred to is deposited above the brushes 247 and against the surface of the traveling compound 246.

At a further station in the travel of the compound 246 while clinging to roller 243, laterally spaced knives 249 press upwardly against the surface of roller 243 to progressively sever or trim the calendered compound to an exact and uniform width which may approximately equal or be slightly less than the space between keys 89 which, as before described, upstand from the cavity containing surfaces of the mold sections 79. Knives 249 are fixed to hubs 250 which are turnable on cross shaft 251 fixed at each end in the calender frames 231 and grooved to receive the inner end of screw 252 to prevent displacement of hubs 250 lengthwise of shaft 251. A weight 253 suspended from the outer ends of the knives 249 effects the upward thrust of the cutting end of the knife against roller 243. The edge portions 254 of the traveling sheet of compound thus trimmed off are allowed to drop to the floor or into any suitable container while the intermediate portion of the traveling sheet of compound 255 is received by the conveyer belt 223 and carried away from the calender on an upward incline as a traveling sheet of compound having predetermined and uniform thickness and width.

At the beginning of its inclined travel, the belt 223 is supported by a correspondingly inclined shelf 256 extending crosswise the calender and supported by side brackets 257 which are attached to and project from the calender frames 231. Brackets 256 further support in vertically adjustable position, a second gang of brushes 258 coextensive in length with the trimmed width of the traveling sheet of compound 255. By depositing powdered material such as hereinbefore mentioned on the traveling surface of the compound 255 back of, or to the right of brushes 258 in Fig. 2, the top surface of the compound is progressively coated with the powdered material in a manner similar to the coating of the under surface of the compound by brushes 247 as before described.

Each end of the pulley 230 which supports belt 223 is itself supported in a bearing such as 259 which may be independently moved toward the right or toward the left in Fig. 2 by turning the adjustor nut 260 on the adjustor stud 261 which passes through a stationary support bracket 262 fixed to the calender frames 231. By this means either of the lengthwise edges of the endless belt 223 may be selectively loosened or tightened in relation to the looseness or tightness of the opposite edge, whereby the delivery end of the belt, at pulley 222, can be minutely controlled as to its running position lengthwise of the pulley 222 or in lateral relation to the traveling mold sections of the heat treating machine.

The operation of the combined calendering, dust applying, trimming, conveying, and segregating apparatus of these improvements will in the main have become apparent from the preceding description of its mechanical parts. In order to point out the advantages of some of its features, the operation as a whole is reviewed as follows:

At such intervals as the supply batch of compound 242 may need replenishing, additional batches are added to the partially consumed batch with the result that a continuous supply of compound is fed between the calender rollers 243 and 244, roller 243 being constantly rotated at a slow speed by the large spur gear 263 fixed on its shaft which may be driven by a small power pinion 264 at selective speed determined by variable speed transmission mechanism within the casing 265 powered by the electric rotor 266 and subject to the speed control of the speed selecting handle 267, all as indicated diagrammatically in Fig. 7. The sheet of compound thus calendered between rollers 243 and 244 has somewhat irregular edges and is dusted by suitable powdered material on one surface as it passes the brushes 247.

On reaching the knives 249, the calendered sheet which is now of uniform thickness is also trimmed to accurately determined uniform width. The edge portions are discharged downwardly as scrap while the traveling sheet of compound 255 possessing uniform and accurately determined cross sectional dimensions is received onto the top surface of traveling belt 223 with respect to which it is prevented from adhering by the coating of anti-adhesive dust previously applied. A corresponding coating of anti-adhesive powder is progressively applied to the other or top surface of the traveling sheet 255 by the brushes 258. The sheet continues its ride up the incline supported and conveyed by belt 223 to its highest point of travel over idler pulley 224, thence downwardly with belt 223 to the point of its discharge therefrom at pulley 222. Fig. 2 indicates a considerable contraction of the spacing of the calender from the receiving end of the molding and vulcanizing machine, it being understood that in practice the stretch of belt 223 between its calender mounted pulley 230 and the idler rollers 224 and 225 may be of considerable extent to give ample room and time for inspection of the traveling sheet of compound 255 and periodic tests of its condition as to thickness and the thorough dusting of all of its surfaces with the anti-adhesive powder.

Figs. 4 and 6 most clearly show the transfer of the traveling sheet of compound from its last point of support by conveyer belt 223 diagonally downward toward the line of rolling contact of the periphery of the fluid cooled roller 211 with the top cavity containing surfaces of the constantly traveling mold sections 79.

As the traveling sheet of compound 255 is drawn in by and squeezed between roller 211 and the top faces of the mold sections 79 it is progressively severed into separate strips 268 of continuous length which are progressively segregated and simultaneously lodged in the parallel adjacent mold cavities 92 of the mold section which is passing roller 211 and which cavities respectively align end to end with corresponding cavities in each adjacent mold section of the train. Important factors in the success of this operation include the following: The roller 211 is kept relatively cool by a continuous supply to and discharge from its hollow interior, of cold water through pipe 217, while the mold blocks 79 are kept relatively hot by the proximity thereto of steam plates 175 and 199. This prevents the compound from adhering to the surface of the roller and facilitates the lodging of strips 268 cleanly in the mold cavities. The roller 211 is power driven to rotate with a linear surface speed equal to that of the faces of mold sections 79, which latter travel toward the right as the roller 211 rotates counterclockwise in Fig. 4. Through gears 218 and 219, the belt pulley 222 is rotated at such speed as to impart to the conveyor belt 223 a linear speed of travel also equal to that of the mold sections 79. The speed of travel of the calender rolls 243 and 244 may be made such as to deliver the traveling sheet of compound 255 to the calender end of the conveyor belt 223 at a rate to insure against any stretching or distortion of the weak bodied compound that would tend to impair its smoothness, or the uniformity of its thickness and width.

By the above described means there is insured a uniform cross sectional size of the segregated strips or charges of compound 268 predeterminably smaller than the mold chambers in which they are contained as such chambers are formed by the coming together of mold sections 79 and 78 in Figs. 4 and 8. Through heat treatment while traveling within these chambers, each strip or charge of sponge rubber compound is expanded and vulcanized into the progressively generated cylindrical strip 269 of Fig. 6.

In order that the ultimately vulcanized product may have uniform porosity and a smooth exterior surface accurately conforming to the walls of the mold cavities this uniformity of volumetric size of the charges introduced into the mold cavities must be attained and the improved apparatus herein disclosed has proven not only successful to this end but greatly increases the possible speed of production and saving of labor cost in comparison with any former known methods and apparatus.

In Figs. 1 and 3 it is shown that the spur gear 115 exerts its power drive on the successively passing mold sections 79 at a point in their travel somewhat in advance of the line of contact of roller 211 with the mold sections. Each mold section is thus shoved ahead toward the roller and likewise shoves ahead the mold section which precedes it thus closing up any space which might otherwise occur between adjacent edges of the mold sections as they pass under the roller. The mold sections at the left of the chain-support wheel 20 in Fig. 4 thereby form in effect a traveling platform having an upper surface uninterrupted by cracks between the mold sections and which platform provides space for the feeding and segregating apparatus of these improvements to cooperate with the traveling mold sections. The force with which roller 211 bears downwardly against the mold sections as the latter ride upon track rollers 102 or other equivalent support means may be regulated by the adjusting nuts 208 by swinging the apparatus frame 205 slightly up or down about its mounting bolts 207. By removing bolts 207 and the top nuts 208 and by disconnecting the water supply pipe 232 and chain 201, the entire feeding apparatus may be quickly and conveniently removed from the molding and vulcanizing machine and replaced by a different apparatus, or may be applied to a different molding and vulcanizing machine. In such case the fixed spacing and intergeared relationship of shaft 203 and trunnions of roller 211 are in no way disturbed. Links may be inserted in or removed from chain 201.

While the cavity containing carriers or mold sections here illustrated, comprise an articulated train of such carriers or sections performing repeated cycles of travel past the roller 211, it will be understood that where it is not necessary that translatory travel be performed by the cavities for the purpose of molding or vulcanizing a product in straight form, the roller 211 can as well be arranged to coact with the heated peripheral surface of a drum rotating about a fixed axis and circumferentially grooved to form the carrier cavities and traveling at linear speed equal to that of the face of the roller and revolving thereagainst. Or such a drum together with roller 211 may be employed merely to sever the traveling sheet 255 into strips, which strips may then contemporaneously be delivered to and progressively lodged in the cavities of the herein illustrated mold sections 92 as a continuous process. Such drum periphery, furthermore, may itself be comprised of a train of articulated carriers or mold sections containing the cavities.

The improved feeding and segregating apparatus hereinbefore illustrated and described will be operative in its main principles if the cavities in mold sections 79 do not communicate end to end but are formed instead as separated depressions sunk in the mold surfaces and spaced from one another in the direction of their line of travel inasmuch as the regulatable thickness of the traveling sheet of material 255 may be progressively maintained at some dimension less than the depth of such separate surface depressions in the mold and hence a restricted charge delivered to each such depression, the volumetric size of which charge is less than that of the depth of the depression or cavity thereby to provide room for expansion of the plastic under heat treatment while lodged in and traveling with the cavity.

Many other departures may be made from the exact construction and relationship of parts herein disclosed to illustrate the present improvements and the appended claims will be understood as intended to cover all variations and equivalents of such constructions and arrangements as come within their terms and utilize the principles of operation herein set forth.

We claim:

1. In apparatus for converting into predetermined charges a preformed traveling sheet of expansible sponge rubber compound or like plastic material and progressively depositing said charges in traveling cavities, the combination with carriers arranged in traveling train formation and containing said cavities, of a roller stationed to revolve in rolling contact with said traveling carriers, a traveling conveyor separated by substantial space from said roller constructed and arranged to transport and deliver said sheet of material to a location in the neighborhood of said roller at a higher level than the line of contact of said roller with said carriers, and means to deflect said conveyor into such path of travel at said location that said sheet of material is thereby played off from said conveyor downwardly through said space and into traveling contact with a portion of the periphery of said roller above and free from said carriers, whereby said sheet is guided thereafter by said roller periphery to its said line of contact with said carriers.

2. In apparatus as defined in claim 1, the combination defined in said claim in which the said conveyor comprises an endless traveling belt, together with common power means connected to impel said belt and the said train of carriers simultaneously at the same linear speed and to rotate said roller simultaneously at such rate that its said periphery travels with like linear speed.

3. In apparatus as defined in claim 1, the combination defined in said claim together with heating means arranged and operative to maintain the said carriers at a relatively high temperature at their said line of contact with the said roller, and means constructed and operative to maintain said roller at a relatively low temperature at said line of contact, both of said means being arranged to leave the temperature of said conveyor unaffected.

4. Apparatus for automatically feeding to and lodging in the entrance mouth of a traveling cavity a charge of sponge rubber compound too small in bulk to fill said cavity, including in combination, a traveling carrier having a working face and containing a cavity space whose mouth opens through said working face, means to feed and to press a sheet of expansible sponge rubber compound of predetermined thickness progressively against said carrier face as the carrier travels and in a manner to sever a charge of said compound from the sheet and force said charge into said cavity mouth the said cavity space being substantially deeper than said predetermined thickness of said sheet of compound so that empty space for the expansion of said charge of compound is left therebeneath within said cavity, means to maintain the traveling carrier relatively hot in the region of said cavity mouth for strengthening the tendency of said charge to lodge adheringly therein thereby to compensate in part for the inability of said charge to reach and adhere to the bottom of the cavity space, and means to maintain said sheet pressing means relatively cool for weakening the tendency of said charge to adhere thereto thereby to so further compensate for said inability of the charge to adhere to the bottom of the cavity space that the traveling carrier is enabled to pick said charge off from said pressing means and carry it away without requiring said cavity space to be packed full of said charge.

5. Apparatus for automatically feeding a variable bulk supply of plastic material into continually traveling carrier cavities at a predetermined volumetric rate, including in combination, a train of said carriers having faces containing said cavities, means to support said carriers for procession in a path of translatory travel, spaced shoulders aligned with said path of travel and upstanding from said faces of the carriers at respective opposite lateral extremities of the working portions of said faces, a pivotally supported roller approximately equal in length to the lateral space between said shoulders and having its peripheral face disposed to revolve in rolling contact with said working faces of said carriers, means progressively to convert said supply of material into a traveling sheet having uniform predetermined thickness, means progressively to trim said traveling sheet to uniform predetermined width approximately equal to the lateral space between said shoulders, and means continually to convey said trimmed sheet of material into proximity to said roller and to deliver said sheet progressively to the mutually contacting face portions of said roller and carriers and between said carrier shoulders at a speed of linear travel substantially equal to that of said carriers.

6. In apparatus for segregating charges of plastic material from a traveling sheet of said material and for simultaneously lodging said charges within one or more receiving cavities in traveling carriers, in combination, a train of said carriers having corresponding faces containing said cavities, means to support said carriers for procession in a path of translatory travel constructed and arranged to prevent rocking of said carriers out of alignment with said path of travel as the carriers pass said support means, a pivotally supported roller having its peripheral face disposed to revolve in rolling contact with the cavity containing faces of said carriers at a point in said path of travel opposite said support means, rack-like gear teeth fixed to said carriers, and a gear stationed to rotate in mesh with said teeth and powered to impel said carriers in said path of travel toward and successively past said roller and support means.

7. In apparatus for segregating charges of plastic material from a traveling sheet of said material of predetermined volumetric size and for delivering said charges into one or more closed processing chambers formed by cooperative cavities in traveling mold sections so that the delivered bulk of said charges is incommensurate with the volumetric size of said cavities, in combination, an upper train of mold sections having downwardly disposed faces containing chamber component cavities, a lower train of mold sections having cooperative upwardly disposed faces containing chamber component cavities, means to support said upper train of mold sections for procession in a path of translatory travel, means to support said lower train of mold sections for procession in a path of translatory travel in part coextensive with and in part extending in front of the path of travel of the upper train of mold sections thereby to provide a traveling platform comprised of a portion of the lower train of mold sections, a pivotally stationed roller supported above the said traveling platform and having its peripheral face disposed to revolve in rolling contact with the cavity containing faces of the lower train of mold sections, and means to feed said sheet of material progressively into riding contact with the revolving face of said roller that is remote from said upper train of mold sections in a manner to so restrict the rate of delivery of said sheet to the mutually contacting faces of said roller and mold sections that said charges of the material are transferred from said sheet to said mold sections in volumetric sizes incommensurate with the volumetric size of said cavities but in selectively determined proportion to the volumetric sizes of said chambers.

8. In apparatus for segregating charges of plastic material from a traveling sheet of said material and for simultaneously lodging said charges within one or more receiving cavities in traveling carriers, in combination, a train of said carriers having corresponding faces containing said cavities, spaced means to support said carriers for procession in a path of translatory travel constructed and arranged to prevent rocking of said carriers out of alignment with said path of travel as the carriers pass said support means, a pivotally supported roller having its peripheral face disposed to revolve in rolling contact with the cavity containing faces of said carriers at a point along said path of travel intermediate said spaced support means, rack-like gear teeth fixed to said carriers, a gear stationed to rotate in mesh with said teeth and powered to impel said carriers toward and successively past said roller in said path of travel, and a cooperative gear stationed to rotate in mesh with the teeth of said carriers which have passed said roller, together with means to oppose rotation of the said cooperative gear thereby to maintain the carriers in tightly abutting relationship as they pass said roller.

9. In combination with apparatus as defined in claim 5, a second train of carriers supported to travel in unison with the train of carriers recited in claim 5 in abutting relation thereto and provided with keyways aligned with the common path of travel of both trains of carriers, and keys projecting from the said faces of the carriers in the other train shaped and disposed to enter and occupy the said keyways during the travel of the said trains in unison and forming the spaced carrier shoulders recited in claim 5.

10. Apparatus as defined in claim 5 in which the said faces of the carriers contain cavities extending to the said spaced shoulders which upstand from said faces thereby to prevent jamming of the plastic material between the ends of the said rolller and the said spaced shoulders which are contiguous thereto.

11. Apparatus for segregating charges of plastic material from a traveling sheet of said material and for simultaneously lodging said charges within receiving cavities of traveling carriers, embodying in combination with a train of said carriers having faces containing said cavities, track-like structure supporting and guiding said train, a pivotally supported roller having a peripheral face disposed to revolve in rolling contact with the cavity containing faces of said carriers, an endless belt for conveying said sheet of material toward said roller, a pulley supporting said belt in the neighborhood of said roller, and an apparatus frame carrying bearings having relatively shiftable sections respectively for said roller and pulley and carrying said track-like structure, whereby said roller and pulley may be adjusted in unison in relation to said train.

12. Apparatus for segregating volumetrically controlled charges of expansible plastic material from a traveling sheet of said material having predetermined and uniform cross sectional shape and progressively depositing the segregated charges in successive cavities in traveling carriers, embodying in combination with carriers arranged to move in train formation and having faces containing said cavities, a hollow roller rotatable in normally stationary bearings at each of its ends and having an opening extending from its hollow interior through one of the said ends said roller having its peripheral face disposed to revolve in rolling contact with said faces of the carriers as the latter move successively therepast, a perforate fluid supply pipe extending lengthwise of the hollow interior of said roller and through its said open end and sufficiently smaller than said opening to permit discharge through said opening of cooling fluid delivered to the interior of the roller through said perforate pipe, and a curved conveyor for carrying said sheet of material so arranged and supported that its sheet conveying surface travels first toward said roller at a higher level than the line of contact thereof with said carriers and is then deflected into a downward direction of travel at a point removed from said roller by a space greater than the thickness of the sheet of material, thereby to play off said sheet downwardly and toward said roller in a manner to suspend the same through said space and maintain said sheet in riding contact with a portion of the periphery of said cylindrical structure which is above and free from said carrier faces until the sheet arrives substantially at said line of contact of said roller with said faces.

13. In combination with apparatus as defined in claim 5 means to shift the course of lengthwise travel of the said sheet of material laterally in a manner to maintain its said predetermined width in register with the space between said carrier shoulders thereby to prevent said sheet from interfering with and climbing up on said shoulders.

14. Apparatus as defined in claim 11 in which the said section of apparatus frame carrying the said bearings for the said roller and the said pulley comprises a skeleton U-shaped structure having spaced side arms pivoted at their free ends to the section of said apparatus frame which carries the said track-like structure.

15. Apparatus as defined in claim 11 together with one or more guide pulleys for the said endless belt pivotally supported on the section of the said apparatus frame which carries the said bearings for the said roller and the said pulley.

16. In combination with apparatus as defined in claim 11 in which the section of the said apparatus frame carrying the said bearings for the said roller and the said pulley is pivoted to the section of the said apparatus frame which carries the said track-like structure, adjustable support means extending between the said two sections of the apparatus frame constructed and arranged to vary and maintain the angular relation between said frame sections.

17. In apparatus for segregating charges of plastic material from a traveling sheet of said material and for delivering said charges into traveling processing chambers formed by mating cavities in traveling mold sections, in combination, upper and lower trains of said mold sections cooperatively supported to travel in unison through a processing station, means to support one end of the said upper train, means to support a corresponding end of the said lower train located at a point displaced a sufficient distance ahead of the first said means along the line of travel of the trains thereby to expose a substantial stretch of the lower train clear of interference by the upper train to serve as a moving platform for receiving the material to be conveyed into the processing station, a roller supported to maintain its peripheral face in rolling surface contact with the cavity containing faces of the lower train of mold sections comprising said moving platform, and means to convey said sheet of material to a point above said moving platform and then play off the same downwardly into belt-like traveling engagement with the frontmost peripheral face of said roller on the side thereof farthest from said upper train of mold sections and at a point on said roller elevated above the lower train of mold sections forming said moving platform.

18. Apparatus for automatically feeding to and depositing in traveling carrier cavities charges of plastic material of substantially smaller volumetric size than is the size of said cavities, including in combination, a train of traveling carriers having faces containing empty cavities of fixed and constant depth, means progressively to prepare and deliver to a station close to said carriers a traveling sheet of said material uniformly thinner than the depth of said cavities, means progressively to segregate charges of said material from said sheet having the said thinness of said sheet, and means to lodge said thin charges respectively within the said deeper cavities in a manner to enable said charges to depart from said traveling sheet and be conveyed away by said carriers, together with wiper means stationed and arranged in contact with the traveling surface of said sheet of material in a manner to hold back a bulk supply of powdered lubricant manually deposited on a portion of said surface close to said wiper means and gradually to feed said lubricant to said surface in a manner progressively and evenly to coat the latter thereby to render said sheet less adherent during its delivery to the said segregating means.

LUDOLF H. DE WYK.
LUDOLF H. DE WYK, Jr.

CERTIFICATE OF CORRECTION.

Patent No. 2,218,527. October 22, 1940.

LUDOLF H. DE WYK, ET AL.

It is hereby certified that error appears in the printed specification of the above numbered patent requiring correction as follows: Page 6, second column, line 54, claim 7, strike out the words "of predetermined volumetric size" and insert the same before "from" in line 53, same claim; page 7, first column, line 70, claim 11, strike out "carrying bearings" and insert the same after "respectively" in line 71, same claim; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.